(12) United States Patent
Sitaram et al.

(10) Patent No.: US 10,834,640 B1
(45) Date of Patent: Nov. 10, 2020

(54) METHODS AND SYSTEMS FOR SELECTIVE SCHEDULING BASED ON SERVICE TYPES TO OPTIMIZE WIRELESS NETWORK CAPACITY

(71) Applicant: Sprint Spectrum LP, Overland Park, KS (US)

(72) Inventors: Krishna Sitaram, Chantilly, VA (US); Hemanth Pawar, Brambleton, VA (US); Shilpa Srinivas, Brambleton, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 72 days.

(21) Appl. No.: 16/155,271

(22) Filed: Oct. 9, 2018

(51) Int. Cl.
   *H04W 28/24* (2009.01)
   *H04W 16/10* (2009.01)
   *H04W 72/12* (2009.01)

(52) U.S. Cl.
   CPC .......... *H04W 28/24* (2013.01); *H04W 16/10* (2013.01); *H04W 72/1242* (2013.01); *H04W 72/1252* (2013.01)

(58) Field of Classification Search
   CPC . H04W 28/24; H04W 16/10; H04W 72/1242; H04W 72/1252; H04W 72/0486; H04W 72/10; H04W 88/08; H04W 88/06; H04W 16/32; H04W 72/06; H04L 1/0027; H04L 47/125
   See application file for complete search history.

(56) References Cited

U.S. PATENT DOCUMENTS

| | | | |
|---|---|---|---|
| 8,385,266 B1 * | 2/2013 | Vargantwar | H04W 88/06 370/328 |
| 8,737,208 B2 | 5/2014 | Ohseki et al. | |
| 2009/0247178 A1 * | 10/2009 | Lunden | H04W 72/04 455/452.1 |
| 2010/0142453 A1 * | 6/2010 | Harada | H04W 72/1273 370/329 |
| 2012/0327877 A1 * | 12/2012 | Zhao | H04W 72/1252 370/329 |
| 2013/0294247 A1 | 11/2013 | Zhu et al. | |
| 2013/0301582 A1 * | 11/2013 | Jiang | H04W 72/042 370/329 |
| 2018/0295573 A1 * | 10/2018 | Gidvani | H04W 52/0216 |
| 2019/0045484 A1 * | 2/2019 | Liu | H04W 72/04 |

* cited by examiner

*Primary Examiner* — Gary Mui
*Assistant Examiner* — Michael K Phillips (57) ABSTRACT

Systems, methods, and processing nodes are related to selective resource allocation in a wireless network. An exemplary method includes determining, at an access node, wireless services utilized by a plurality of wireless devices connected to the access node. The wireless services include a first type of wireless service and a second type of wireless service. The method also includes determining whether a first percentage of the plurality of wireless devices utilizing the first type of wireless service relative to the second type of wireless service is greater than or equal to a service type threshold. The method also includes selecting a dynamic allocation scheme if the first percentage of the plurality of wireless devices utilizing the first type of wireless service relative to the second type of wireless service is greater than or equal to the service type threshold.

16 Claims, 8 Drawing Sheets

| | Cell Throughput Degradation with Number of Simultaneous VoLTE Users | | | |
|---|---|---|---|---|
| No. of VoLTE Devices per cell | Available non-GBR throughput (cell throughput/cell edge user throughput (5% - tile)) [kbps] | | Non-GBR Cell throughput Drop % | |
| | DL | UL | DL | UL |
| 0 | 16960/5698 | 10150/4787 | 0 | 0 |
| 10 | 168690/5640 | 9880/4710 | 0.5 | 2.7 |
| 50 | 15634/5346 | 8863/4539 | 7.8 | 12.7 |
| 100 | 14167/4671 | 7728/3993 | 16.5 | 23.9 |
| 200 | 10094/2585 | 5224/2948 | 40.5 | 48.5 |
| 300 | 2760/585 | 1745/787 | 83.7 | 82.8 |

| Voice Service | Data Service | Priority Data Service Usage | Selected Allocation Scheme |
|---|---|---|---|
| 60% | 40% | 5% | SPS |
| 60% | 40% | 30% | Dynamic |
| 30% | 70% | 10% | Dynamic |
| 50% | 50% | 35% | Dymanic |
| 50% | 50% | 15% | Dynamic |

METHODS AND SYSTEMS FOR SELECTIVE SCHEDULING BASED ON SERVICE TYPES TO OPTIMIZE WIRELESS NETWORK CAPACITY

TECHNICAL BACKGROUND

In wireless networks, an access node allocates and schedules wireless network resources for the wireless devices connected to the wireless network. Typically, the access node communicates allocation information for the downlink channel (DL) and the uplink channel (UL) to the wireless devices over a control channel. For example, for a Long Term Evolution (LTE) wireless network, the Physical Downlink Control Channel (PDCCH) carries all allocation information for both the downlink channel, e.g., physical downlink shared channel (PDSCH), and the uplink channel, e.g., physical uplink shared channel (PUSCH). Each allocation is carried as control information, e.g., Downlink Control Information (DCI) in LTE, and the size of the control information depends upon several factors including, for example, whether an uplink or downlink allocation.

Currently, an access node can use several types of scheduling for the DL and UL resources that are based on how often the allocation is changed, such as persistent scheduling, semi-persistent scheduling (SPS), or non-persistent (dynamic) scheduling. In the case of persistent scheduling, the wireless device receives scheduling assignments or grants at the time of connection, which are used for the entirety of the wireless device's connection to the access node. In the case of SPS, the wireless device receives scheduling assignments or grants that have a time period or periodicity, and the wireless devices receives new assignments once periodicity has expired. In the case of dynamic scheduling, the wireless device receives scheduling assignments or grants in every subframe from the access node.

Each of these scheduling types has drawbacks based on factors and conditions associated with the access node and wireless devices such as the limitations of the control channel, the number of wireless devices connected, the type of wireless services used by the wireless devices, etc. Thus, there is a need to selectively utilize the different types of scheduling based on the factors and conditions associated with the access node and wireless devices.

Overview

Exemplary embodiments described herein include systems, methods, and processing nodes for selective resource allocation in a wireless network. An exemplary method for selective resource allocation in a wireless network includes determining, at an access node, wireless services utilized by a plurality of wireless devices connected to the access node. The wireless services include a first type of wireless service and a second type of wireless service. The method also includes determining whether a first percentage of the plurality of wireless devices utilizing the first type of wireless service relative to the second type of wireless service is greater than or equal to a service type threshold. The method also includes selecting a dynamic allocation scheme if the first percentage of the plurality of wireless devices utilizing the first type of wireless service relative to the second type of wireless service is greater than or equal to the service type threshold.

An exemplary system for selective resource allocation in a wireless network includes a processing node, a memory device, and a processor coupled to the processing node. The processor configures the processing node to determine a first number of wireless devices utilizing data services of the wireless network and a second number of wireless devices utilizing voice services of the wireless network. The processor further configures the processing node to determine whether a first percentage of the first number of wireless devices utilizing data services relative to the second number of wireless devices utilizing voice services is greater than a service type threshold. The processor further configures the processing node to select a dynamic allocation scheme if the first percentage is greater than or equal to the service type threshold.

An exemplary processing node for selective resource allocation in a wireless network is configured to perform operations including determining wireless services utilized by a plurality of wireless devices connected to an access node. The wireless services include a first type of wireless service and a second type of wireless service. The operations include determining that a first percentage of the plurality of wireless devices utilizing the first type of wireless service relative to the second type of wireless service is greater than or equal to a service type threshold. The operations include selecting a dynamic allocation scheme in response to the first percentage being greater than or equal to the service type threshold.

DETAILED DESCRIPTION

According to embodiments of the present disclosure, systems, methods, and processing nodes for selective resource allocation in a wireless network. In embodiments, a type of allocation scheme is selected based on factors and conditions associated with the access node and wireless devices. For example, an access node can include or communicate with a scheduler that selects a type of allocation scheme based on factors and conditions associated with the access node and wireless devices. The scheduler can dynamically select that the type of allocation scheme, which best utilizes wireless resources based the factors and conditions associated with wireless devices connected to the access node. As the conditions change, the scheduler can evaluate the current allocation scheme utilized and select a new allocation scheme if favorable to the change in conditions.

In embodiments, the scheduler can select between an SPS allocation scheme and a dynamic allocation scheme based on the current conditions associated with the wireless devices and the access node. The scheduler 116 can dynamically select either the SPS allocation scheme or the dynamic allocation scheme in order to utilize the advantages and minimize the disadvantages of the SPS allocation scheme or the dynamic allocation scheme.

These and additional operations are further described with respect to the embodiments depicted in FIGS. 1-6 below.

Figure 1:
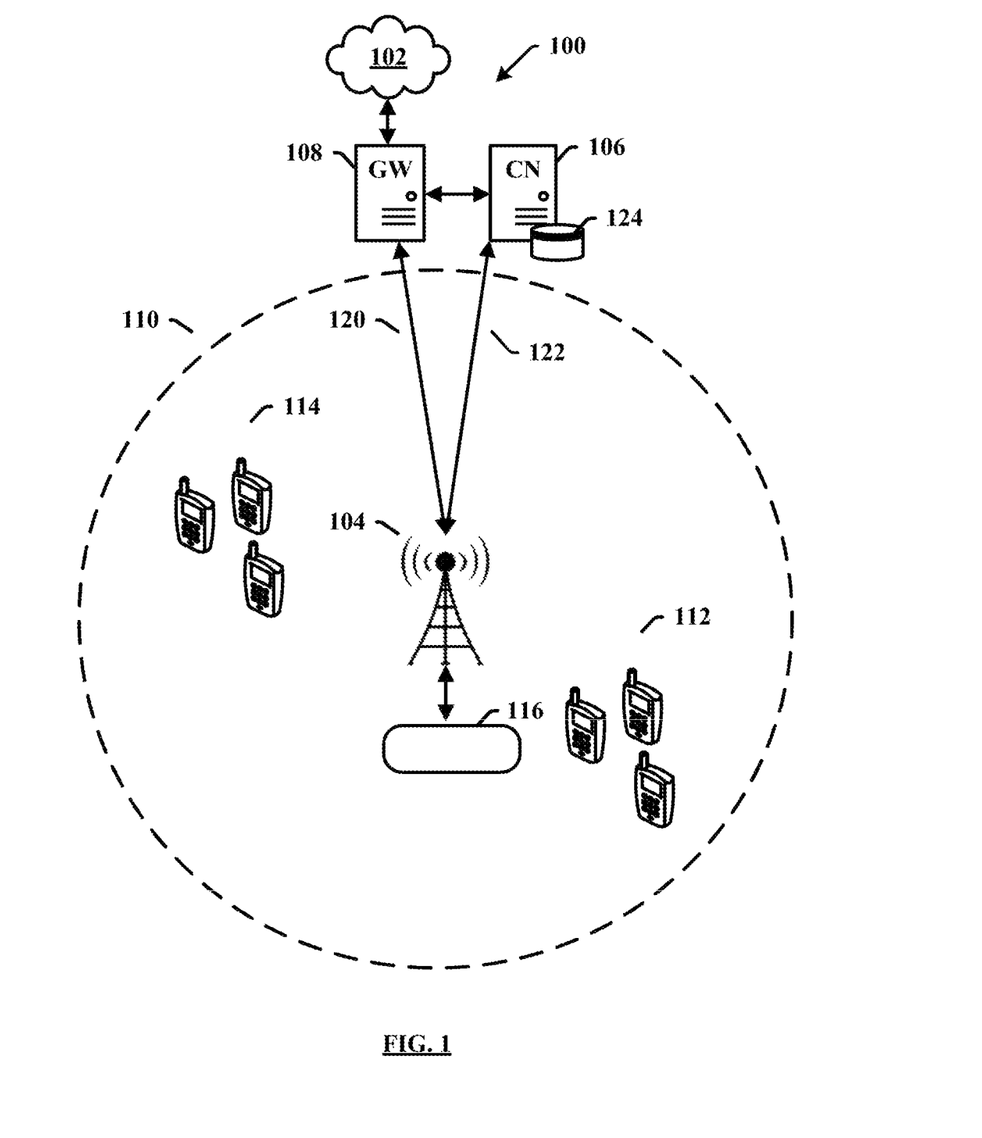
FIG. 1 depicts an example of a system for selective resource allocation in a wireless network, according to embodiments of the present disclosure.

FIG. 1 depicts an example of a communication system 100 for selective scheduling in a wireless network. While FIG. 1 illustrates various components contained in the communication system 100, FIG. 1 illustrates one example of a communications system and additional components can be added and existing components can be removed.

As illustrated in FIG. 1, the communication system 100 includes a communication network 102, an access node 104, a controller node 106, and a gateway node 108. Other network elements can be present in the communication system 100 to facilitate communication but are omitted for clarity, such as base stations, base station controllers, mobile switching centers, dispatch application processors, and location registers such as a home location register or visitor location register. Furthermore, other network elements can be present to facilitate communication between the access node 104 and the communication network 102 which are omitted for clarity, including additional processing nodes, routers, gateways, and physical and/or wireless data links for carrying data among the various network elements.

The access node 104 is illustrated as having a coverage area 110. The access node 104 can serve wireless devices such as wireless devices 112 and 114. For example, the wireless devices 112 and 114 can include mobile phones, tablet computers, laptop computers, internet-of-thing (IoT) devices or machine-to-machine ("m2m") devices and the like. The access node 104 can provide various type of wireless services to the wireless devices 112 and 114, such as data services and voice services. To provide the wireless services to the wireless devices 112 and 114, the access node 104 can allocate and schedule wireless resources to the wireless devices 112 and 114, for example, resource blocks in an orthogonal frequency-division multiplexing (OFDM) scheme.

Figure 4A:
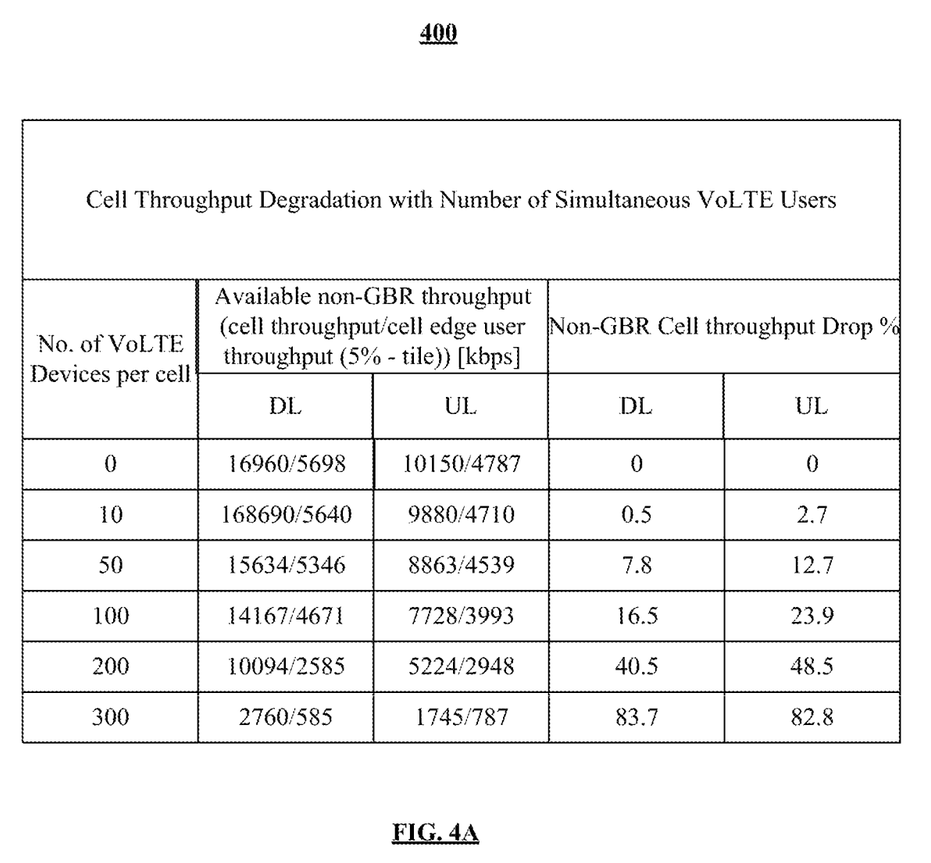
FIG. 4A depicts a table showing wireless resource usage, according to embodiments of the present disclosure.

For example, the number of the wireless devices 112 and 114, serviced by the access node 104, simultaneous using voice services, e.g., voice over LTE (VoL users in a cell, may have significant impact on wireless network capacity. As the number of the wireless devices 112 and 114 using voice services increases, the DL & UL throughput performance may decline significantly. For example, FIG. 4A illustrates a table 400 that includes LTE field data of the degradation. As illustrated in FIG. 4A, 50 VoLTE Users may cause an expected cell degradation of 13%, and 100 VoLTE Users may cause an expected cell degradation by 24%.

Figure 4B:
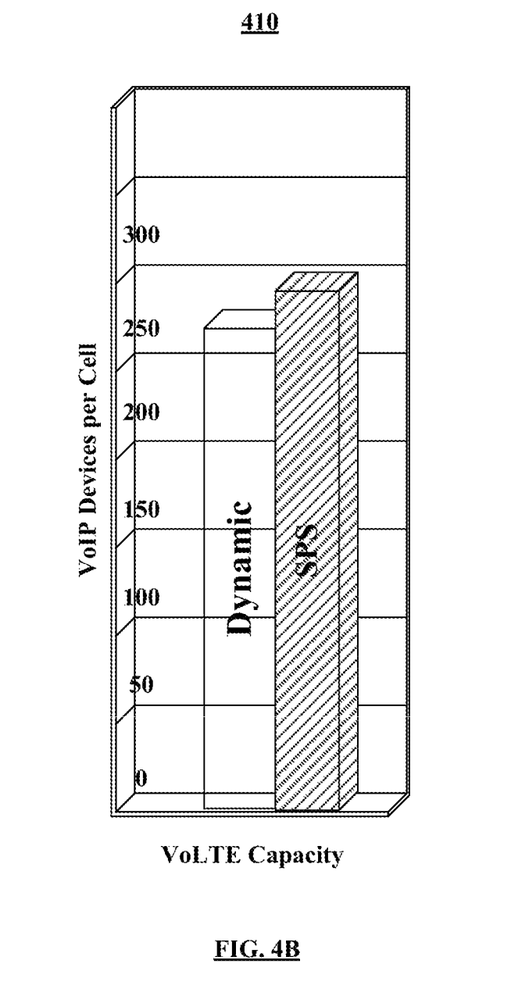
FIGS. 4B and 4C depict graphs showing allocation scheme improvements based on wireless service usage, according to embodiments of the present disclosure.
Figure 4C:
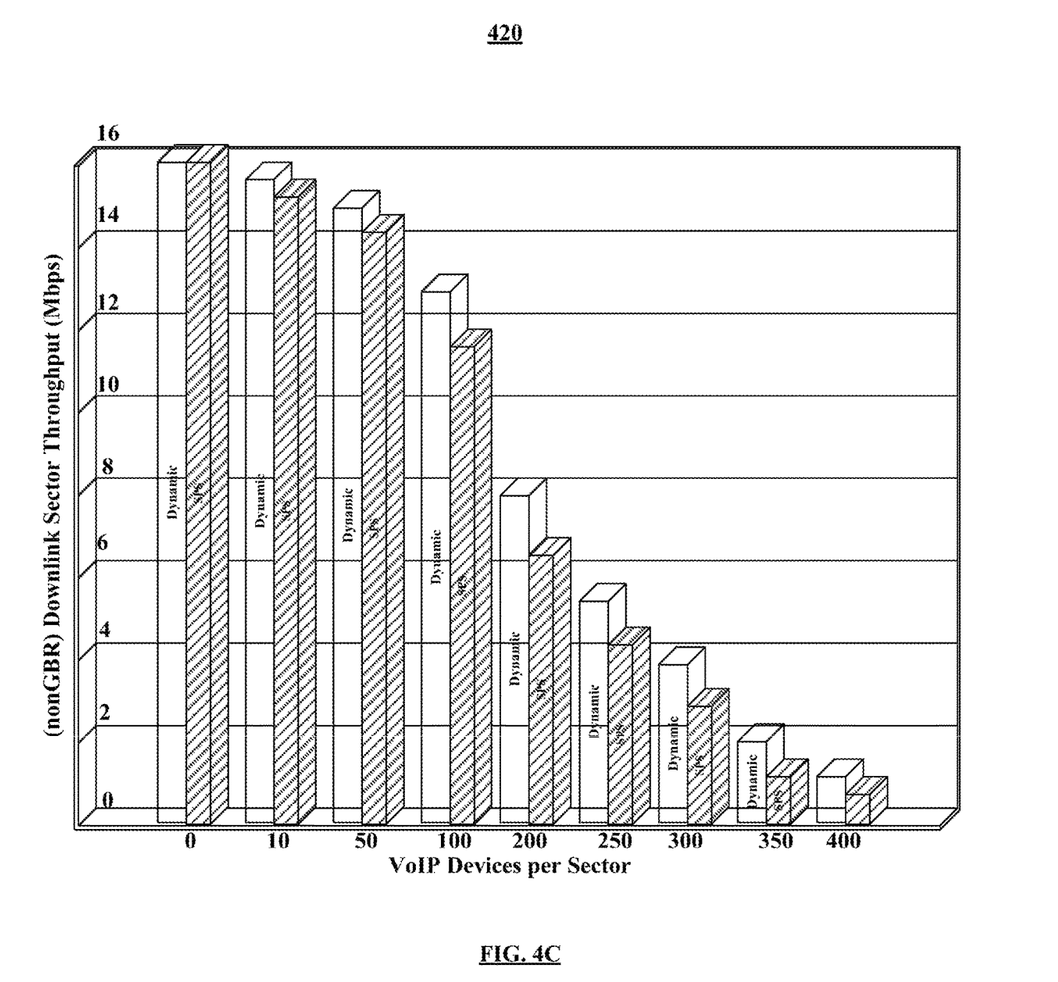

In addition to the type of wireless services affecting performance, the type of allocation scheme may also affect wireless network performance. For example, the control channel utilized by the access node 104 to communicate allocation information to the wireless devices 112 and 114 may be limited in size, e.g., the PDCCH in LTE may be 3 OFDM symbol times. Because of the limited size, there is a limit as to how many DCIs can be carried in a subframe, e.g., 1 millisecond (ms). This can in-turn limit the wireless devices 112 and 114 which can receive an allocation for that subframe when the scheduler 116 utilizes dynamic scheduling. Further, as illustrated in FIG. 4B, an SPS allocation scheme may only increase voice services, e.g., VoLTE, capacity by 4% vs dynamic scheduler. Even though a SPS allocation scheme uses the control channel, e.g., PDCCH, more efficiently, the SPS allocation scheme has a lower data region capacity, e.g., PDSCH, as shown in FIG. 4C. On the other hand, a dynamic allocation scheme uses the data region, e.g., PDSCH, more efficiently but may lead to the control channel, e.g., PDCCH, saturation in high voice service, e.g., VoLTE, usage. The dynamic allocation scheme provides a Load that is +25% more efficient than a SPS allocation scheme for mixed voice and data services usage, as shown in FIG. 4C.

Additionally, for wireless services such as voice over internet protocol (VoIP), the packet size is small and the inter-arrival time of VoIP is constant, i.e., adaptive multi-rate (AMR) codec provides one packet every 20 ms during active period and one silence indicator (SID) at 160 ms. The control channel, e.g., PDCCH, overhead may be excessive for certain wireless network architectures, e.g., Evolved Universal Telecommunications Radio Access Network (E-UTRAN) in order to support a large number of the wireless devices 112 and 114 using VoIP. So, a solution is to allocate the resources at once and let the wireless device use these resources instead of allocating the resources periodically. During SPS allocation scheme, certain things remain fixed for each allocation: RD assignments, modulation and coding scheme, etc. Because of this, if the radio link conditions change, a new allocation will need to be sent on the control channel, e.g., PDCCH. So, with SPS allocation schemes may be suited to periodic communication like voice, thereby allowing more allocations with the same control channel resources and more simultaneous VoLTE calls.

In embodiments, the access node 104 is coupled to or includes a scheduler 116. The scheduler 116 can be configured to allocate and schedule wireless network resources for the wireless devices 112 and 114 connected to the access node 104. The scheduler 116 can be configured to dynamically select a type of allocation scheme, which best utilizes wireless resources based the factors and conditions associated with the wireless devices 112 and 114 connected to the access node 104. As the conditions change, the scheduler 116 can be configured to evaluate the current allocation scheme utilized and select a new allocation scheme if favorable to the change in conditions.

In order to support more allocations, without increasing the size of the PDCCH, the scheduler 116 can be configured to dynamically select a dynamic allocation scheme and a SPS allocation scheme. In embodiments, the scheduler 116 can be configured to select between an SPS allocation scheme and a dynamic allocation scheme based on the current conditions associated with the wireless devices 112 and 114 and the access node 104. For example, the scheduler 116 can be configured to dynamically select either the SPS allocation scheme or the dynamic allocation scheme in order to utilize the advantages and minimize the disadvantages of the SPS allocation scheme or the dynamic allocation scheme.

In embodiments, the scheduler 116 determines, tracks, and stores the types of wireless services utilized by the wireless devices 112 and 114, e.g., the number wireless devices using voice services and the number of wireless devices using data services. Additionally, for the wireless devices 112 and 114 utilizing the data services, the scheduler 116 determines, tracks, and stores a priority associated with the data service usage. For example, the scheduler 116 can determine that video steaming, audio streaming, and gaming correspond to high priority data service usage. Once determined, the scheduler 116 determines a service percentage of the wireless devices 112 and 114 utilizing the data services relative to the wireless devices 112 and 114 utilizing the voice services. The scheduler 116 then compares the service percentage to a service threshold, Θ.

If the service percentage exceeds the service threshold, Θ, the scheduler 116 implements a dynamic allocation scheme in the access node 104. By implementing a dynamic allocation scheme at the service threshold of data service usage, the scheduler 116 can ensure improve experience for the wireless devices 112 and 114 utilizing data services by providing optimum throughput.

Figure 5:
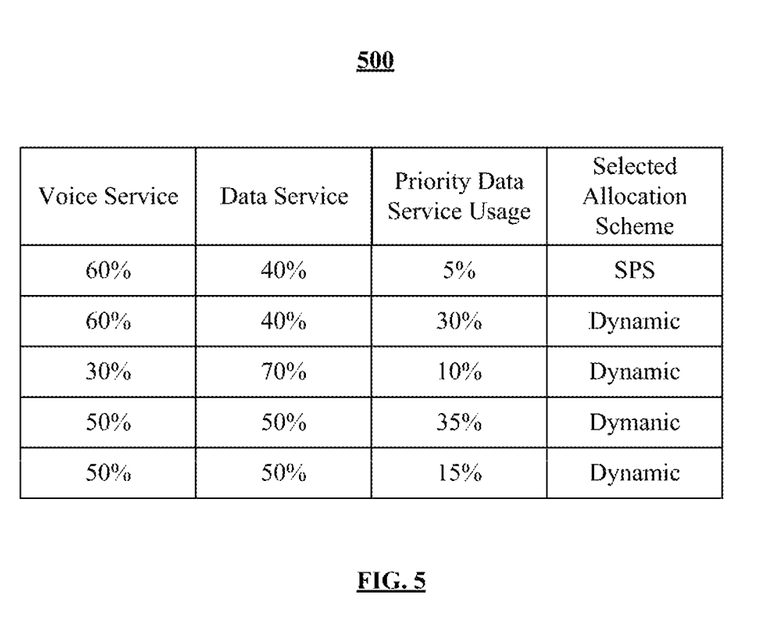
FIG. 5 depicts a table showing examples of allocation scheme selection based on data and voice service usage, according to embodiments of the present disclosure.

Additionally, if number the service percentage is less than the service threshold, the scheduler 116 determines a priority percentage of the wireless devices 112 and 114 utilizing the data services that are high priority relative to the wireless devices 112 and 114 utilizing the data services that are low priority. The scheduler 116 then compares the priority percentage to a priority threshold, β. If the priority percentage is higher than the priority threshold, β, the scheduler 116 implements a dynamic allocation scheme in the access node 104. By implementing a dynamic allocation scheme at the service threshold of data service usage, the scheduler 116 can best data usage for high priority users. The scheduler 116 can be preconfigured with the service threshold, Θ, and the priority threshold, β, based on historical performance of the allocation schemes. For example, FIG. 5 illustrates wireless resource improvements based on allocation scheme. Likewise, the scheduler 116 can monitor the performance of the allocation schemes and automatically update the service threshold, Θ, and the priority threshold, β, in real time.

If the service percentage and priority percentage is less than the thresholds, the scheduler 116 implements a SPS allocation scheme in the access node 104. With a SPS allocation scheme, the access node 104 can preconfigure the wireless devices 112 and 114 with an SPS allocation identification (SPS ID), for example, SPS radio network temporary identifier (SPS-RNTI) in LTE, and a periodicity. Once pre-configured, if the wireless devices 112 and 114 were to receive an allocation, downlink (DL) or uplink (UL), using the SPS-ID, instead of the typical cell radio network temporary identifier (C-RNTI), the access node 104 can utilize the allocation until the periodicity expires or ends.

When the scheduler 116 selects a dynamic allocation scheme, the access nodes has full flexibility in assigning the resources to the wireless devices 112 and 114 at the cost of transmission of resource allocation information reported on the control channel, e.g., PDCCH, in every subframe. Also, by selecting dynamic allocation, the access node 104 has the flexibility of varying the resource allocation based on the reported channel conditions between the access node 104 and the wireless devices 112 and 114.

The communication network 102 can be a wired and/or wireless communication network. The communication network 102 can include processing nodes, routers, gateways, and physical and/or wireless data links for communicating signals among various network elements. The communication network 102 can include one or more of a local area network, a wide area network, and an internetwork (including the Internet). The communication network 102 can be capable of communicating signals, for example, to support voice, push-to-talk, broadcast video, and data communications by wireless devices 112, 114, etc. Wireless network protocols can include one or more of Multimedia Broadcast Multicast Services (MBMS), code division multiple access (CDMA) 1×RTT (radio transmission technology), Global System for Mobile communications (GSM), Universal Mobile Telecommunications System (UMTS), High-Speed Packet Access (HSPA), Evolution Data Optimized (EV-DO), EV-DO rev. A, Worldwide Interoperability for Microwave Access (WiMAX), Third Generation Partnership Project Long Term Evolution (3GPP LTE), Fourth Generation broadband cellular (4G, LTE Advanced, etc.), and Fifth Generation mobile networks or wireless systems (5G, 5G NR, or 5G LTE). Wired network protocols utilized by the communication network 102 can include one or more of Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). The communication network 102 can include additional base stations, controller nodes, telephony switches, internet routers, network gateways, computer systems, communication links, or other type of communication equipment, and combinations thereof.

The access node 104 can be any network node configured to provide communication between the wireless devices 112 and 114, and the communication network 102, including standard access nodes and/or short range, low power, small access nodes. For instance, the access node 104 can include any standard access node, such as a macrocell access node, base transceiver station, a radio base station, an eNodeB device, an enhanced eNodeB device, gNodeB (gNB), and the like. In other embodiments, the access node 104 can be a small access node including a microcell access node, a picocell access node, a femtocell access node, or the like such as a home NodeB or a home eNodeB device.

The access node 104 can include a plurality of antennae and transceivers for enabling communication using various operating modes and different frequency bands or carriers and establishing wireless connections and communication links, e.g., air interfaces, with the wireless devices 112 and 114. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), Long Term Evolution (LTE), and 5G—including combinations, improvements, or variations thereof. Moreover, it is noted that while the access node 104 is illustrated in FIG. 1 any number of access nodes, including relay nodes, can be implemented within the system 100.

The access node 104 can include a processor and associated circuitry to execute or direct the execution of computer-readable instructions to perform operations such as those further described herein. Briefly, the access node 104 can retrieve and execute software from storage, which can include a disk drive, a flash drive, memory circuitry, or some other memory device, and which can be local or remotely accessible. The software can include computer programs, firmware, or some other form of machine-readable instructions, and can include an operating system, utilities, drivers, network interfaces, applications, or some other type of software, including combinations thereof. Further, the access node 104 can receive instructions and other input at a user interface. The access node 104 communicates with the gateway node 110 and controller node 108 via communication links 120, 122. The access node 104 can communicate with other access nodes (not shown) using a direct link such as an X2 link or similar link.

The wireless devices 112 and 114 can be any device, system, combination of devices, or other such communication platform capable of communicating wirelessly with access nodes, such as the access node 104, using one or more frequency bands deployed therefrom. As discussed above, for example, the wireless devices 112 and 114 can be, for example, a mobile phone, a wireless phone, a wireless modem, user equipment (UE), a personal digital assistant (PDA), a voice over internet protocol (VoIP) phone, a voice over packet (VOP) phone, or a soft phone, as well as other types of devices or systems that can exchange audio or data via the access node 104. Likewise, for example, the wireless devices 112 and 114 can include IoT devices such as physical devices, vehicles, home appliances, and other items embedded with electronics, software, sensors, actuators, and connectivity which enables connection to the communication network 102. Other types of communication platforms are possible.

The controller node 106 can be any network node configured to communicate information and/or control information over the communication system 100. The controller node 106 can be configured to transmit control information associated with a handover procedure. The controller node 106 can be a standalone computing device, computing system, or network component, and can be accessible, for example, by a wired or wireless connection, or through an indirect connection such as through a computer network or communication network. For example, the controller node 106 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art will recognize that the controller node 106 is not limited to any specific technology architecture, such as LTE and can be used with any network architecture and/or protocol.

The controller node 106 can include a processor and associated circuitry to execute or direct the execution of computer-readable instructions to obtain information. The controller node 106 can retrieve and execute software from storage, which can include a disk drive, a flash drive, memory circuitry, or some other memory device, and which can be local or remotely accessible. In an example, the controller node 106 includes a database 124 for storing information for authenticating and allowing access to wireless devices 112 and 114, as discussed herein. This information can be requested by or shared with the access node 104, via wireless connections and communication links, wired communication links, X2 connections, and so on. The software can include computer programs, firmware, or some other form of machine-readable instructions, and can include an operating system, utilities, drivers, network interfaces, applications, or some other type of software, and combinations thereof. The controller node 108 can receive instructions and other input at a user interface.

The gateway node 108 can be any network node configured to interface with other network nodes using various protocols. The gateway node 108 can communicate user data over the communication system 100. The gateway node 108 can be a standalone computing device, computing system, or network component, and can be accessible, for example, by a wired or wireless connection, or through an indirect connection such as through a computer network or communication network. For example, the gateway node 108 can include a serving gateway (SGW) and/or a public data network gateway (PGW), etc. One of ordinary skill in the art will recognize that the gateway node 108 is not limited to any specific technology architecture, such as LTE and can be used with any network architecture and/or protocol.

The gateway node 108 can include a processor and associated circuitry to execute or direct the execution of computer-readable instructions to obtain information. The gateway node 108 can retrieve and execute software from storage, which can include a disk drive, a flash drive, memory circuitry, or some other memory device, and which can be local or remotely accessible. The software can include computer programs, firmware, or some other form of machine-readable instructions, and can include an operating system, utilities, drivers, network interfaces, applications, or some other type of software, including combinations thereof. The gateway node 108 can receive instructions and other input at a user interface.

The communication links 120, 122 can use various communication media, such as air, space, metal, optical fiber, or some other signal propagation path—including combinations, improvements, or variations thereof. The communication links 120, 122 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, GSM, CDMA, WiMAX, or LTE, —including combinations, improvements, or variations thereof. The communication links 120, 122 can include Si communications links. Other wireless protocols can also be used. The communication links 120, 122 can be a direct link or might include various equipment, intermediate components, systems, and networks. The communication links 120, 122 can include many different signals sharing the same link.

In the embodiments and examples described above and below, the access node 104 and controller node 106 are described as performing the operations of preventing messaging overload in the communication network 100. In any of the embodiments and examples, however, other elements of the communication network 100 can perform any portion of the process described above.

Other network elements can be present in the communication system 100 to facilitate communication but are omitted for clarity, such as base stations, base station controllers, mobile switching centers, dispatch application processors, and location registers such as a home location register or visitor location register. Furthermore, other network elements that are omitted for clarity can be present to facilitate communication, such as additional processing nodes, routers, gateways, and physical and/or wireless data links for carrying data among the various network elements, e.g. between the access node 104 and the communication network 102.

Figure 2:
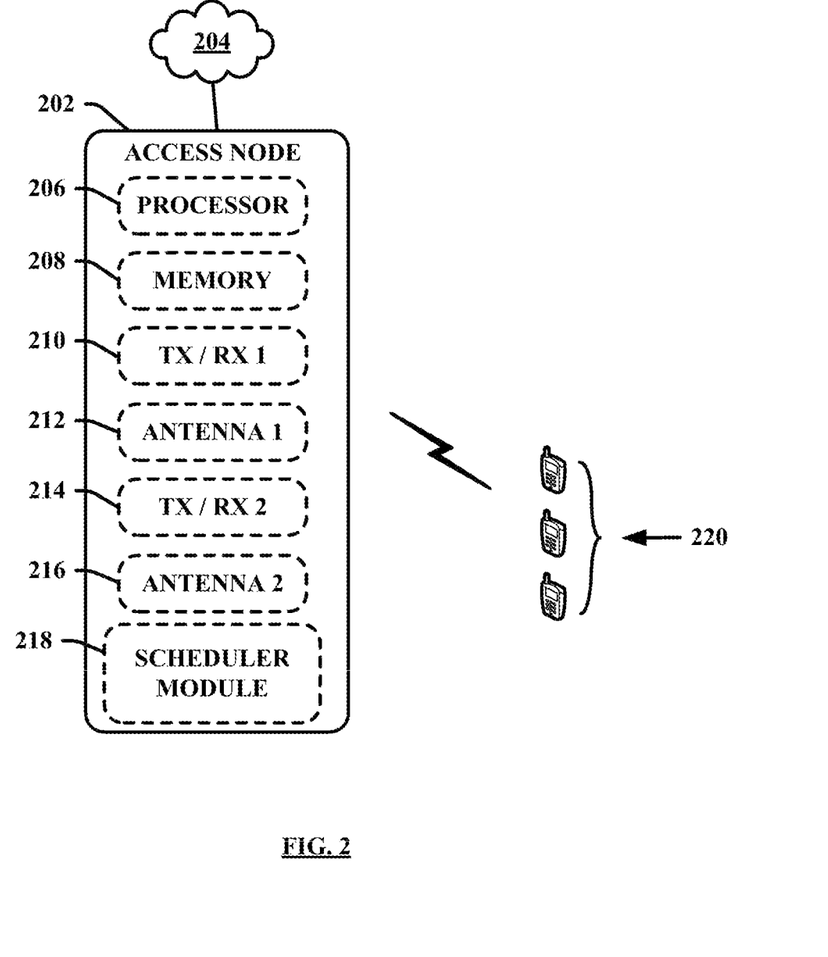
FIG. 2 depicts an example of an access node in a system for selective resource allocation in a wireless network, according to embodiments of the present disclosure.

FIG. 2 depicts components of an example of an access node 202 coupled to and communicating with a communication network 204. For example, the access node 202 and communication network 204 can be an example of the access node 104 and communication network 102, as illustrated in FIG. 1. In this example, the access node 202 includes a processor 206, a memory 208, a first transceiver 210, a first antenna 212, a second transceiver 214, and a second antenna 216. The access node 202 can also include a scheduler module 218 for performing the processes described herein.

As illustrated, the first transceiver 210, first antenna 212, second transceiver 214, and second antenna 216 can provide communication signals to provide an air link with wireless devices 220. For example, the wireless devices 220 can be examples of the wireless devices 112 and 114, as illustrated in FIG. 1. The antenna 212 (and/or the antenna 216) can be used to deploy a signal to communicate with the wireless devices 220 and establish a wireless connection and communication link. It should be understood that each antenna 214, 216 can comprise a plurality of antennae or antennae arranged in one or more arrays.

In embodiments, the scheduler module 218 can configured to control the establishment of manage resource allocation for wireless connections, as described herein. In embodiments, the connection module 218 can be implemented as hardware, software, or combinations thereof. In one example, the connection module 218 can be implemented as a software program or module that includes logical instructions for performing the process described herein. In this example, a copy of the connection module 218 can be stored in memory 208 and the logical instructions of the connection module 218 can be executed by processor 206. Additionally, the memory 208 can store data used by the scheduler module 218 such as number of wireless devices 112 and 114 using data services and voice services, the service threshold, the priority threshold, etc.

In another example, the scheduler module 218 can be implemented as a hardware unit contain within or coupled to the access node 202. In this example, the scheduler module 218 can include one or more processors and associated circuitry to execute or direct the execution of computer-readable instructions to perform operations and processes as described herein. The scheduler module 218 can retrieve and execute software, which includes logical instructions for performing the process described herein, from storage. The storage can include a disk drive, a flash drive, memory circuitry, or some other memory device, and which can be local or remotely accessible. The software can comprise computer programs, firmware, or some other form of machine-readable instructions, and can include an operating system, utilities, drivers, network interfaces, applications, or some other type of software, including combinations thereof.

While FIG. 2 illustrates the scheduler module 218 being a part of the access node 202, the scheduler module 218 can be a part of another device or system communicating with the access node 202, for example, the controller 106, the gateway 108, or other device or system. Likewise, the scheduler module 218 can be a stand-alone system or device that communicates with the access node 202.

Figure 3:
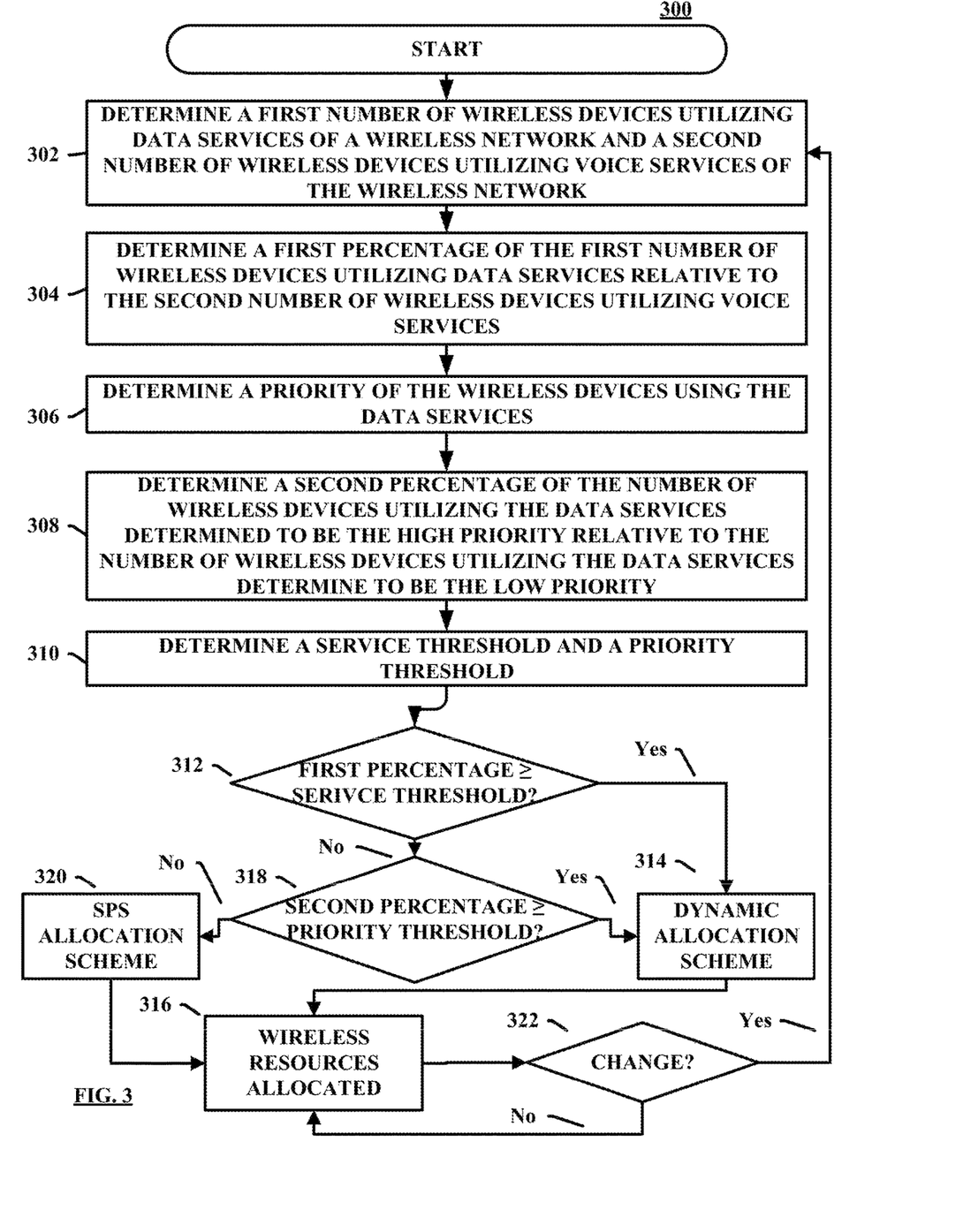
FIG. 3 depicts an example of a method for selective resource allocation in a wireless network, according to embodiments of the present disclosure.

FIG. 3 depicts an example of a method 300 for selective allocating resources in a wireless network. The method 300 of FIG. 3 can be implemented in any network node such as the access node 104, as illustrated in FIG. 1. In other embodiments, the method 300 can be implemented with any suitable network element, for example, any network element illustrated in FIG. 1 or FIG. 2. Although FIG. 3 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

After the process begins, in 302, a first number of wireless devices utilizing data services of the wireless network and a second number of wireless devices utilizing voice services of the wireless network are determine. For example, the scheduler 116 can examine the connection to the wireless devices 112 and 114 and determine the number of the wireless devices 112 and 114 using the data services and the number of the wireless devices 112 and 114 using the voice services.

In 304, a first percentage of the first number of wireless devices utilizing data services relative to the second number of wireless devices utilizing voice services is determined.

In 306, a priority of the wireless devices using the data services can be determined. For example, the scheduler 116 can examine the connection to the wireless devices 112 and 114 that are using the data services and determine the priority of the usage of the data services. The scheduler 116 can determine that video steaming, audio streaming, and gaming correspond to high priority data service usage.

In 308, a second percentage of the number of wireless devices utilizing the data services determined to be the high priority relative to the number of wireless devices utilizing the data services determined to be the low priority is determined.

In 310, a service threshold and a priority threshold are determined. For example, the scheduler can the service threshold, $\Theta$, and the priority threshold, $\beta$, from memory. The scheduler 116 can be preconfigured with the service threshold, $\Theta$, and the priority threshold, $\beta$, based on historical performance of the allocation schemes. Likewise, the scheduler 116 can monitor the performance of the allocation schemes and automatically update the service threshold, $\Theta$, and the priority threshold, $\beta$, in real time.

In 312, the first percentage is compared to the service threshold. If first percentage is greater than or equal to the service threshold, in 314, a dynamic allocation scheme is selected. For example, the scheduler 116 can compare the service percentage to the service threshold, $\Theta$, and implement the dynamic allocation scheme in the access node 104 if the service percentage is greater than or equal to the service threshold $\Theta$. Method 300 then proceeds to 316.

If first percentage is less than the service threshold, in 318, the second percentage is compared to the priority threshold. If second percentage is greater than or equal to the priority threshold, in 314, a dynamic allocation scheme is selected. For example, the scheduler 116 can compare the priority percentage to the priority threshold, $\beta$, and implement the dynamic allocation scheme in the access node 104 if the priority percentage is greater than or equal to the priority threshold, $\beta$. Method 300 then proceeds to 316.

In 318, if second percentage is less than the priority threshold, in 320, a SPS allocation scheme is selected. For example, the scheduler 116 can implement the SPS allocation scheme in the access node 104.

FIG. 5 illustrates a table 500 showing examples of selecting an allocation scheme as described above. For example, the scheduler 116 can determine a service threshold of $\Theta=60\%$ and the priority threshold $\Theta=25\%$. Based on this, the scheduler 116 can select either the SPS allocation scheme and the dynamic allocation scheme in different service usage as shown in table 500.

By dynamically selecting either the SPS allocation scheme or the dynamic allocation scheme, the scheduler 116 can utilize the advantages and minimize the disadvantages of the SPS allocation scheme or the dynamic allocation scheme. When the scheduler 116 selects a dynamic allocation scheme, the access nodes has full flexibility in assigning the resources to the wireless devices 112 and 114 at the cost of transmission of resource allocation information reported on the control channel, e.g., PDCCH, in every subframe. Also, by selecting dynamic allocation, the access node 104 has the flexibility of varying the resource allocation based on the reported channel conditions between the access node 104 and the wireless devices 112 and 114.

In 316, wireless resources can be allocated and utilized according to the selected allocation scheme. For example, the access node 104 can allocate and the wireless devices 112 and 114 can utilize the selected allocation scheme, and both can communicate using the selected allocation scheme.

In 322, it can be determined if a change occurs in the wireless service usage. For example, the scheduler 116 can monitor the access node 104 and wireless devices 112 and 114 to determine if new wireless devices 112 and 114 connect to the access node 104, if the wireless devices 112 and 114 change wireless services used, if one or more of the wireless devices 112 and 114 disconnect from the access node. If there is no change, monitoring can continue. If there is a change, method 300 can return to 302.

At any point, the method 300 can end or return to any point.

The methods, systems, devices, networks, access nodes, and equipment described above can be implemented with, contain, or be executed by one or more computer systems and/or processing nodes. The methods described above can also be stored on a non-transitory computer readable medium. Many of the elements described herein can be, comprise, or include computers systems and/or processing nodes. This includes, but is not limited to: the access node 104, the controller node 106, the gateway node 108, the wireless devices 112, 114, 116 and 118, and/or the network 102.

Figure 6:
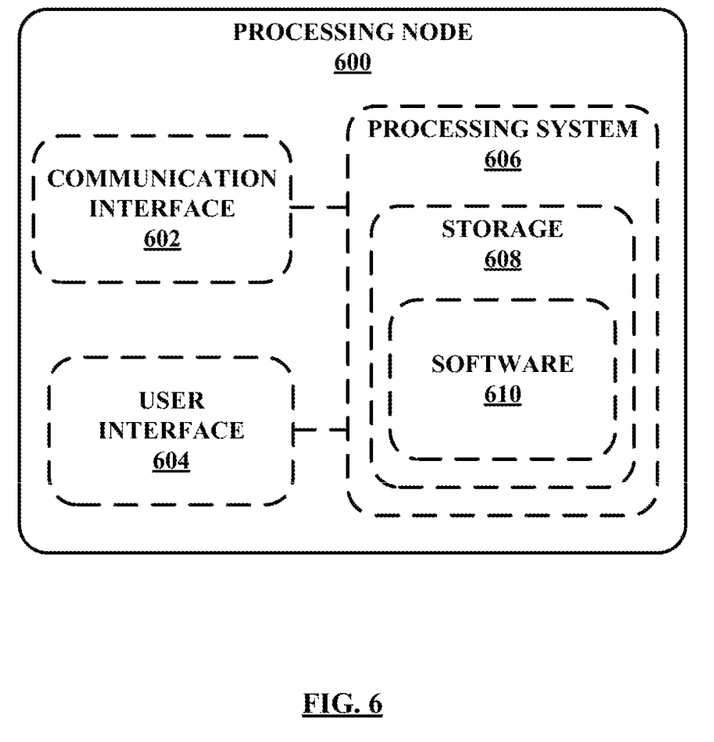
FIG. 6 depicts an example of a processing node for preventing message overloading in a wireless network, according to embodiments of the present disclosure.

FIG. 6 depicts an example of a processing node 600. The processing node 600 includes a communication interface 602, a user interface 604, and, a processing system 606 in communication with the communication interface 602 and the user interface 604. The processing system 606 includes storage 608, which can comprise a disk drive, flash drive, memory circuitry, or other memory device. The storage 608 can store software 610, which is used in the operation of the processing node 600. The storage 608 can include a disk drive, flash drive, data storage circuitry, or some other memory apparatus. For example, the storage 608 can include a buffer. The software 610 can include computer programs, firmware, or some other form of machine-readable instructions, including an operating system, utilities, drivers, network interfaces, applications, or some other type of software. For example, in some embodiments, the software 610 can include instructions to implement the method 300, as described above.

The processing system 606 can include a microprocessor and other circuitry to retrieve and execute the software 610 from the storage 608. The processing node 606 can further include other components such as a power management unit, a control interface unit, etc., which are omitted for clarity. The communication interface 602 permits the processing node 600 to communicate with other network elements. The user interface 604 permits the configuration and control of the operation of the processing node 600.

The examples of systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium can include, for example, modulated signals transmitted through wired or wireless transmission paths.

While the teachings have been described with reference to examples of the embodiments thereof, those skilled in the art will be able to make various modifications to the described embodiments without departing from the true spirit and scope. The terms and descriptions used herein are set forth by way of illustration only and are not meant as limitations. In particular, although the processes have been described by examples, the stages of the processes can be performed in a different order than illustrated or simultaneously. Furthermore, to the extent that the terms "including", "includes", "having", "has", "with", or variants thereof are used in the detailed description, such terms are intended to be inclusive in a manner similar to the term "comprising." As used herein, the terms "one or more of" and "at least one of" with respect to a listing of items such as, for example, A and B, means A alone, B alone, or A and B. Further, unless specified otherwise, the term "set" should be interpreted as "one or more." Also, the term "couple" or "couples" is intended to mean either an indirect or direct connection. Thus, if a first device couples to a second device, that connection can be through a direct connection, or through an indirect connection via other devices, components, and connections.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for selective resource allocation in a wireless network, the method comprising:
   determining, at an access node, wireless services utilized by a plurality of wireless devices connected to the access node, wherein the wireless services comprise a data service or a voice service;
   determining whether a first percentage of the plurality of wireless devices utilizing the data service relative to the voice service is greater than or equal to a service type threshold;
   selecting a dynamic allocation scheme if the first percentage of the plurality of wireless devices utilizing the data service relative to the voice service is greater than or equal to the service type threshold; and
   selecting a semi-persistent allocation scheme if the first percentage of the plurality of wireless devices utilizing the data service relative to the voice service is less than the service type threshold.

2. The method of claim 1, further comprising:
  determining a priority of the plurality of wireless devices utilizing the data service, wherein the priority comprises a high priority and a low priority;
  determining a second percentage of the plurality of wireless devices utilizing the data service determined to be the high priority relative to the plurality of wireless devices utilizing the data service determined to be the low priority; and
  selecting the dynamic allocation scheme if the first percentage of the plurality of wireless devices utilizing the data service relative to the voice service is less than the service type threshold and the second percentage of the plurality of wireless devices utilizing the data service determined to be the high priority relative to the plurality of wireless devices utilizing the data service determined to be the low priority is greater than or equal to a priority threshold.

3. The method of claim 2, wherein the high priority of the plurality of wireless devices utilizing the data service comprises the plurality of wireless devices utilizing the data service for gaming and streaming.

4. The method of claim 2, the method further comprising:
  determining a change in the wireless services utilized by the plurality of wireless devices connected to the access node; and
  updating the first percentage based on the change in the wireless services utilized by the plurality of wireless devices.

5. The method of claim 4, the method further comprising:
  selecting the dynamic allocation scheme if the updated first percentage of the plurality of wireless devices utilizing the data service relative to the voice service is greater than or equal to the service type threshold; and
  selecting the semi-persistent allocation scheme if the updated first percentage of the plurality of wireless devices utilizing the data service relative to the voice service is less than the service type threshold.

6. The method of claim 4, the method further comprising:
  updating, based on the change in the wireless services utilized by the plurality of wireless devices, the second percentage of the plurality of wireless devices utilizing the data service determined to be the high priority relative to the plurality of wireless devices utilizing the data service determined to be the low priority; and
  selecting the dynamic allocation scheme if the updated first percentage of the plurality of wireless devices utilizing the data service relative to the voice service is less than the service type threshold and the updated second percentage of the plurality of wireless devices utilizing the data service determined to be the high priority relative to the plurality of wireless devices utilizing the data service determined to be the low priority is greater than or equal to the priority threshold.

7. A system for selective resource allocation in a wireless network, the system comprising:
  a processing node;
  a memory device; and
  a processor coupled to the processing node and the memory device, the processor configuring the processing node to
    determine a first number of wireless devices utilizing data services of the wireless network and a second number of wireless devices utilizing voice services of the wireless network;
    determine whether a first percentage of the first number of wireless devices utilizing data services relative to the second number of wireless devices utilizing voice services is greater than a service type threshold;
    select a dynamic allocation scheme if the first percentage is greater than or equal to the service type threshold; and
    select a semi-persistent allocation scheme if the first percentage of the plurality of wireless devices utilizing the data service relative to the voice service is less than the service type threshold.

8. The system of claim 7, the processor further configuring the processing node to
  determine a priority of the number of wireless devices utilizing the data services, wherein the priority comprises a high priority and a low priority;
  determine a second percentage of the number of wireless devices utilizing the data services determined to be the high priority relative to the number of wireless devices utilizing the data services determined to be the low priority; and
  select the dynamic allocation scheme if the first percentage is less than the service type threshold and the second percentage is greater than or equal to a priority threshold.

9. The system of claim 8, wherein the high priority corresponds to the number of wireless devices utilizing the data service for gaming and streaming.

10. The system of claim 8, the processor further configuring the processing node to
  determine a change in the data services and the voice services utilized by the wireless devices; and
  update the first percentage based on the change in the data services and the voice services utilized by the wireless devices.

11. The system of claim 10, the processor further configuring the processing node to
  select the dynamic allocation scheme if the updated first percentage is greater than or equal to the service type threshold; and
  select the semi-persistent allocation scheme if the updated first percentage is less than the service type threshold.

12. The system of claim 10, the processor further configuring the processing node to
  update, based on the change in the data services and the voice services utilized by the wireless devices, the second percentage of the number of wireless devices utilizing the data services determined to be the high priority relative to the number of wireless devices utilizing the data services determined to be the low priority; and
  selecting the dynamic allocation scheme if the updated first percentage is less than the service type threshold and the updated second percentage is greater than or equal to the priority threshold.

13. A processing node for selective resource allocation in a wireless network, the processing node comprising a processor and a memory, the memory for storing instructions that are executed by the processor to perform operations comprising:
  determining wireless services utilized by a plurality of wireless devices connected to an access node, wherein the wireless services comprise a data service or a voice service;
  determining that a first percentage of the plurality of wireless devices utilizing the data service relative to the voice service is greater than or equal to a service type threshold;

selecting a dynamic allocation scheme in response to the first percentage being greater than or equal to the service type threshold; and selecting a semi-persistent allocation scheme in response to the first percentage being less than the service type threshold.

14. The processing node of claim 13, the processing node being further configured to perform operations comprising:

determining a change in the wireless services utilized by the plurality of wireless devices connected to the access node;

updating the first percentage based on the change in the wireless services utilized by the plurality of wireless devices;

determining that the updated first percentage of the plurality of wireless devices utilizing the data service relative to the voice service is less than the service type threshold; and selecting the semi-persistent allocation scheme in response to the updated first percentage being less than the service type threshold.

15. The processing node of claim 14, the processing node being further configured to perform operations comprising:

determining a priority of the plurality of wireless devices utilizing data service, wherein the priority comprises a high priority and a low priority;

determining a second percentage of the plurality of wireless devices utilizing the data service determined to be the high priority relative to the plurality of wireless devices utilizing the data service determined to be the low priority; and selecting the dynamic allocation scheme in response to the second percentage of the plurality of wireless devices utilizing the data service determined to be the high priority relative to the plurality of wireless devices utilizing the data service determined to be the low priority being greater than or equal to a priority threshold.

16. The processing node of claim 15, wherein the high priority of the plurality of wireless devices utilizing the data service comprises the plurality of wireless devices utilizing the data service for gaming and streaming.

\* \* \* \* \*